May 31, 1932.      C. E. JOHNSON      1,861,059
ROTOR FOR SILENT MOTORS
Filed April 8, 1930

INVENTOR:
CARL E. JOHNSON,
BY
Fad. W. Lewis

ATTORNEY.

Patented May 31, 1932

1,861,059

UNITED STATES PATENT OFFICE

CARL E. JOHNSON, OF PASADENA, CALIFORNIA

ROTOR FOR SILENT MOTORS

Application filed April 8, 1930. Serial No. 442,514.

My invention relates to electric motors of the induction type, and more particularly to a novel rotor for use with such a motor.

Motors of the induction type ordinarily comprise a laminated magnetic stator providing slots in which the windings are positioned, these windings being grouped around an opening in which the rotor is adapted to rotate. This rotor is usually of the cast type including a laminated magnetic body providing conductors extending parallel to the axis of the shaft, these conductors being joined at their ends by end rings.

Such a motor has been found to develop certain noises which are very audible in certain installations, these noises being mainly due to pulsations which are set up when the conductors sweep past the stator slots.

In meeting the demand for a silent motor some manufacturers have attempted to use a rotor providing conductors which are skewed relative to the axis of rotation. In other words, the conductor extends helically around the axis of the shaft, these conductors being so formed that if the ends thereof are projected on a plane perpendicular to the axis of the shaft, the angle between these projections will be greater than the angle or displacement between adjacent stator slots. Putting it in other words, the skewed conductor is influenced by the stator windings in a number of slots at any particular instant, rather than being influenced by the winding in a single slot.

From a performance standpoint a motor with a skewed rotor is not, however, as satisfactory as the ordinary type of motor. Primarily such a motor has a pull-out torque which is much less than the pull-out of a similar motor having conductor bars parallel to the axis of the shaft. Furthermore, the efficiency of such a skewed-rotor motor is less, and it has been found that the skewed conductor bars have a tendency to move the rotor axially out of the stator. This net force must not only be resisted by the bearings of the motor, thus increasing the wear thereon, but also causes noise where the belt or other drive exerts an opposite thrust which is approximately equal thereto.

It is an object of the present invention to provide a rotor for a silent motor in which no net thrust is exerted on the bearings.

A further object of the invention is to provide a silent motor having the desirable characteristics of a skewed-rotor motor, yet one which is not subject to the defects of the skewed-rotor type, and especially to provide a motor having a pull-out torque comparable to a torque of a similar motor having rotor conductors parallel to the axis of the shaft.

These and other objects are accomplished by forming the rotor slots so that the axis of any particular slot is bent and not parallel to the axis of rotation.

It is a further object of the invention to provide a rotor having slots, the axis of each slot being bent throughout at least a portion of its length.

A further object of the invention is to provide a rotor having a conductor slot providing two portions so disposed that the angular displacement of the ends of any portion is greater than the angular displacement of the stator slots.

Such a bent axis may be in the shape of a wave or zigzag or may be purely sinusoidal, the shape thereof determining the wave form of the potential induced in the conductor. Thus by suitably designing the shape of these conductors, it is possible to change the characteristics of the motor.

In the preferred embodiment it is preferable to so form the conductor slots that the axis of one portion thereof extends helically around the rotor in a given direction, and the axis of another portion extends helically around the rotor in a given direction, and the it is one of the important objects of this invention to so position these portions.

A further object of the invention is to provide a rotor conductor formed of two portions, the ends of which preferably lie on a line parallel to the axis of rotation.

Further objects and advantages will be made evident hereinafter.

Referring particularly to the drawing,—

Figure 3:
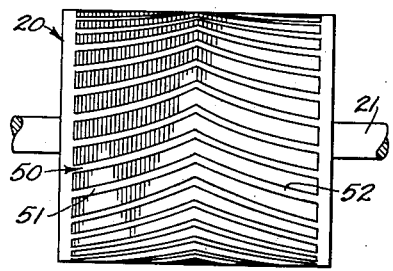
Figure 4:
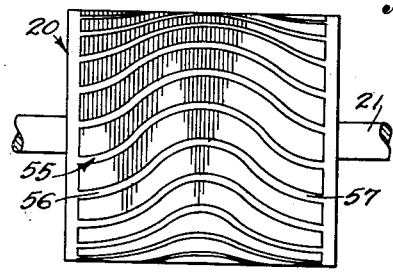
Figure 5:
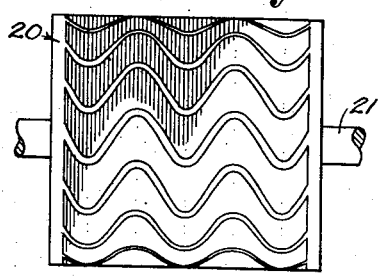

Figs. 3, 4, and 5 are views illustrating alternative methods of forming the rotor.

Figure 1:
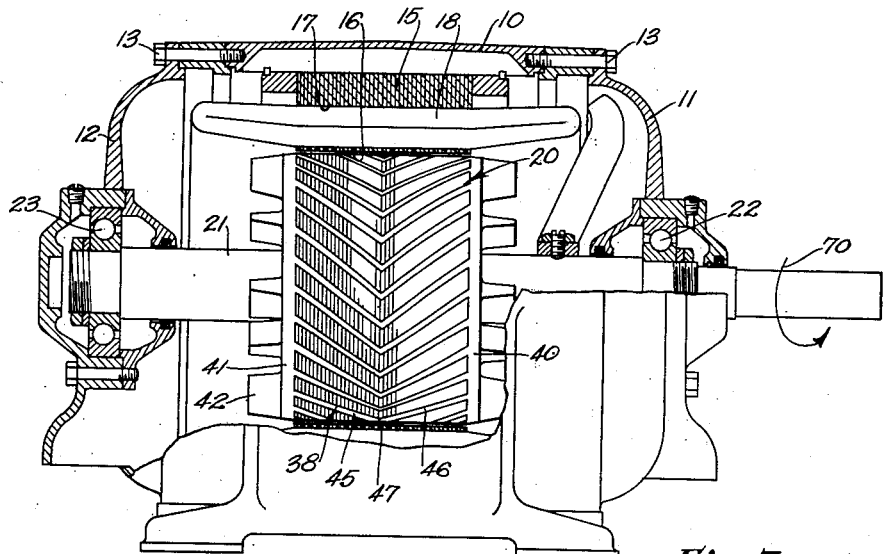
Fig. 1 is a view partially in section of the motor incorporating the rotor of my invention.

Referring particularly to Fig. 1, I have illustrated a motor frame 10 to which end-bells 11 and 12 are secured by suitable bolts 13. Mounted in this frame is a stator 15 including a magnetic body formed of a plurality of laminations cut in annular form so as to provide a rotor opening 16 when assembled. These laminations are punched in the usual manner and when clamped together provide stator slots 17 formed longitudinally through the magnetic body. Subsequently, one or more conductors are positioned in each of these slots in the usual manner, these conductors forming a stator winding 18.

Figure 2:
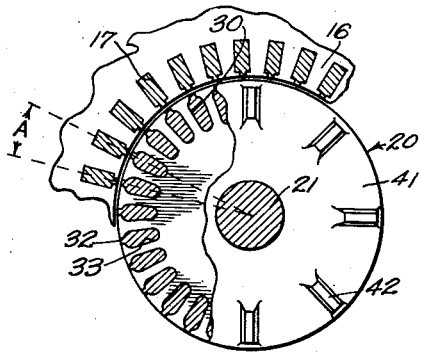
Fig. 2 is a view partially in section of the motor shown in Fig. 1.

Disposed in the rotor opening 16 is a rotor 20 of my invention, this rotor being suitably keyed to a shaft 21 rotatably mounted in bearings 22 and 23 retained in the end-bells 11 and 12 in the usual manner. This rotor is formed of a magnetic body comprising a plurality of punchings or laminations, each of which includes openings 30 formed therein, these openings communicating with the periphery of the punchings through a gap 32. As shown in Fig. 2, the angular displacement between adjacent openings 30 may be equal to the angular displacement between adjacent stator slots 17, the latter angle being indicated by the letter A.

A plurality of these laminations are stacked together to form the magnetic body of the rotor 20, and either during this stacking or thereafter the openings 30 of each lamination are disposed slightly out of alignment with the openings of the adjacent lamination, the net result being the formation of rotor slots 33, the axis of each slot being bent. In the preferred form of the invention shown in Fig. 1 this axis extends helically around the rotor in one direction for half of its length, and extends in the other direction for the remainder of its length. The outer ends of the rotor slots preferably lie on a line parallel to the axis of rotation of the shaft, and thus parallel to the stator slots 17.

When the laminations are thus disposed, the rotor windings are cast in the usual manner so that the rotor slots 33 are filled with aluminum or other material of high electrical conductivity so as to form conductor bars 38. During this casting operation end-rings 40 and 41 are also cast in place and connect the ends of adjacent conductor bars 38. Fan blades 42 may also be formed during this casting operation if desired.

It will thus be seen that each conductor bar 38 comprises one portion 45 and another portion 46, these portions being joined at an apex 47. Due to the helical shape of the axes of the rotor slots 33, both of these portions 45 and 46 extend non-parallel to the stator slots 17. In fact, the angle of lead of these axes is such that each portion 45 or 46 bridges two or more of the stator slots 17 in skewed relationship therewith. Thus, if the ends of any particular portion 45 or 46 are projected on a plane perpendicular to the axis of rotation of the shaft, the angular displacement therebetween in this plane should be equal to or greater than the angle A shown in Fig. 2 which represents the angular displacement of the stator slots, the projected angle being termed the angular displacement of the ends of that portion of the conductor bar which was projected. In the preferred form of my invention it is preferable that the portions 45 and 46 be symmetrical and that the apex 47 lies in the center of the magnetic body.

It should be understood, however, that my invention is not confined to the use of two of these angular portions. Any number of these angular portions may be utilized in forming the conductor bar 38, as will be pointed out more in detail later.

Nor is it necessary that the laminations be so positioned that the portions 45 and 46 have axes which are helically disposed relative to each other. Thus, in Fig. 3 I have shown a rotor having conductor bars 50 including portions 51 and 52 which do not define true helices about the axis of the shaft 21 and yet which are obtusely disposed and which have the desirable effect. In this form of the invention the apex angle is greater than that shown in Fig. 1, due to the fact that the portions 51 and 52 are not true helices, being formed of an auxiliary curve superimposed on a helix.

Similarly, in Fig. 4 I have shown another type of conductor bar 55 providing portions 56 and 57 which are symmetrical about the middle of the magnetic body and obtusely disposed with respect to each other, each of these portions being formed with a curved axis. In this particular form the shape of this curve is shown as being a sine curve superimposed on a helix, although obviously I am not limited to the use of this particular shape. In general the shape of the portions of the conductor bar determines the wave form of the voltage induced in the rotor, and thus bears a direct relationship with the characteristics of the motor. By thus varying the shape of the axes of these portions it is possible to design motors suitable for different purposes.

In Fig. 5 I have shown still another form of conductor bar, the axis of which is sinusoidal and comprises a number of complete sine curves instead of a plurality of zigzag portions such as represented in Fig. 1.

In all of these forms, it will be noted that if the rotor is turning in a direction indicated by the arrow 70 of Fig. 1 and the apex, or apices, of any conductor bar lies adjacent a particular stator slot 17, any subsequent movement of the rotor will cause this stator slot to be bridged by symmetrical portions of the conductor bar. There is thus no net end-thrust on the shaft which must be overcome by the bearings 22 and 23. This is of extreme importance both from a standpoint of wear on the bearings and from a standpoint of noiseless operation. In conventional skewed-rotor motors the tendency of the rotor to move axially from the stator was often resisted by a belt force acting upon the pulley of the motor which was just sufficient to cause the rotor to "float" axially in the stator. In this event vibration took place. A net thrust effect by such a belt drive is not uncommon, and in my form of the invention this thrust may be taken directly by the bearings 22 and 23 without interposing any electrical thrust which might counterbalance the belt thrust.

One of the very important features of this motor is its high pull-out torque as compared to other motors of the skewed-rotor type. Furthermore, this type of motor has been found to be extremely quiet in operation, and the efficiency thereof is well above that of the usual motor having a skewed rotor.

In all of the forms of my invention shown, the conductors are of zigzag shape and are positioned in herring-bone relationship with respect to each other. The term zigzag has not been limited to the form shown in Figs. 1 and 2 wherein the apices are relatively sharp, but has also been used with regard to the slots and conductors such as shown in Figs. 4 and 5 where the apices are somewhat curved and approach or assume a sinuous shape.

I claim as my invention:

1. A rotor for a dynamo-electric machine, comprising: a magnetic body; conductor bars associated with said magnetic body each conductor bar extending helically around the periphery of said magnetic body in a given direction for a portion of its length and in an opposite direction for another portion of its length; and means for electrically connecting the ends of adjacent conductor bars.

2. A rotor for a dynamo-electric machine, comprising: a magnetic body comprising a plurality of laminations each of which comprises a plurality of rotor slots, said laminations being assembled so that the slots of adjacent laminations are staggered slightly resulting in a conductor space extending around the axis of said magnetic body in a given direction for a portion of its length and in an opposite direction for another portion of its length; and a conductor extending through said conductor space.

3. A rotor for a dynamo-electric machine, comprising: a magnetic body comprising a plurality of laminations each of which comprises a plurality of rotor slots, said laminations being assembled so that the slots of adjacent laminations are staggered slightly resulting in a conductor space extending helically around the axis of said magnetic body in a given direction for one half of its length and in an opposite direction for the other half of its length; a conductor extending through said conductor space.

4. A combination as defined in claim 2 in which a line drawn through the outermost ends of each conductor space would be parallel to the rotational axis of said rotor.

5. In a silent induction motor, the combination of: a stator comprising a magnetic body including stator slots extending therethrough; a winding in said stator slots; a rotor mounted to rotate adjacent said stator, said rotor providing a plurality of conductor spaces each of which comprises portions disposed obtusely relative to each other and non-parallel to said stator slots so as to bridge at least two of these stator slots; and interconnected conductor bars extending through said portions of said conductor spaces.

6. In a silent induction motor, the combination of: a stator including stator slots spaced a given angular distance from each other; windings in said stator slots; a rotor providing rotor slots each of which includes at least two portions providing nonparallel axes, the angular displacement of the ends of any one of said portions being greater than the angular displacement of said stator slots; and conductor means in said rotor slots.

7. In a silent induction motor, the combination of: a stator providing a rotor opening, there being slots extending longitudinally through said stator adjacent said rotor opening; a stator winding disposed in said slots; a rotatably mounted shaft extending into said rotor space, the axis of said shaft being parallel to said slots; a rotor mounted on said shaft and providing rotor slots, each of said rotor slots providing two portions angled relative to each other and both portions being non-parallel to said stator slots, each of said portions extending across two or more of said stator slots, the outer ends of any one rotor slot lying on a line substantially parallel to the axis of said shaft; and conductors disposed in said rotor slots.

8. A rotor for a dynamo-electric machine, comprising: a magnetic body adapted to rotate about a given axis; and a plurality of conductors of zigzag shape extending from end to end of said magnetic body and positioned thereon in herring-bone relationship.

In testimony whereof, I have hereunto set my hand at Los Angeles, California, this 4th day of April, 1930.

CARL E. JOHNSON.